United States Patent

[11] 3,607,940

[72] Inventors Eugene J. Miller, Jr.
Wheaton;
Harlan E. Tiefenthal, Western Springs;
Steven C. Ducey, Broadview; Frederick S. Marsh, Chicago, all of Ill.
[21] Appl. No. 663,520
[22] Filed Aug. 28, 1967
[45] Patented Sept. 21, 1971
[73] Assignee Armour Industrial Chemical Company

[54] β-ALIPHATICAMINOPROPIONAMIDES
6 Claims, No Drawings
[52] U.S. Cl............................................ 260/561,
106/2, 260/28.5, 264/300
[51] Int. Cl........................................... C07c 103/18
[50] Field of Search.......................... 260/561 A

[56] References Cited
UNITED STATES PATENTS
2,523,275  9/1950  Bruce et al.................  260/562
3,201,472  8/1965  Spivack.......................  260/583
FOREIGN PATENTS
723,006  2/1955  Great Britain................
41,213   1966    Japan............................

Primary Examiner—Alex Mazel
Assistant Examiner—R. v. Rush
Attorneys—Carl C. Batz and Francis W. Young ABSTRACT: β-aliphaticaminopropionamides having a secondary-alkyl group prepared by the reaction of a secondary-alkyl amine or diamine with acrylamide providing a superior product for uses such as hot melt wax adhesive slip agents and as settling agents for particulate suspensions in hydrocarbon systems.

β-ALIPHATICAMINOPROPIONAMIDES

BACKGROUND

Prior to this invention, β-normal-alkyl amino-propionamides have been known. The propionamides of this invention having a secondary-alkyl group attached to the amino nitrogen atom, have been produced from recently available N-secondary-alkyl primary amines and alkylene diamines derived therefrom and have been found to be surprisingly superior to other amides when used as hot melt wax slip agents and for the precipitation of particulate suspensions in hydrocarbon systems.

SUMMARY OF INVENTION

This invention is directed to β-aliphaticamino-propionamides having the formula

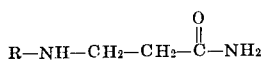

wherein R is selected from the group consisting of secondary-alkyl and secondary-alkyl-$NH(CH_2)_n$-wherein said alkyl radicals have from about 6 to 22 carbon atoms and n is an integer from 2 to 4. One preferred embodiment is directed to compounds of the above formula wherein R is selected from the group consisting of

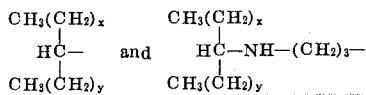

wherein x and y are integers having a sum of about 3 to 19.

The β-aliphaticaminopropionamides of this invention may be prepared by the reaction of N-secondary-alkyl amines with acrylamide in accordance with the following reaction:

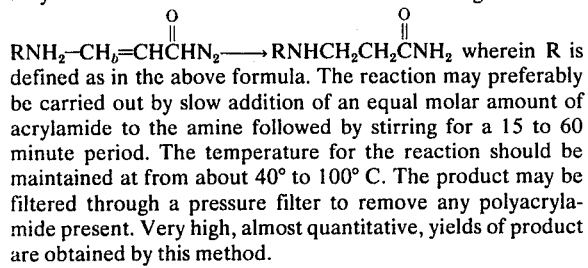

wherein R is defined as in the above formula. The reaction may preferably be carried out by slow addition of an equal molar amount of acrylamide to the amine followed by stirring for a 15 to 60 minute period. The temperature for the reaction should be maintained at from about 40° to 100° C. The product may be filtered through a pressure filter to remove any polyacrylamide present. Very high, almost quantitative, yields of product are obtained by this method.

The secondary-alkyl primary amines used as reactants to form the compounds of this invention may be obtained by hydrolysis of N-secondary-alkyl amides obtained by the amidation of an olefin in the presence of hydrogen fluoride as described in U.S. Pat. application Ser. No. 396,287 filed Sept. 17, 1964 now U.S. Pat. 3,338,967 issued Aug. 29, 1967. N-secondary-alkyl alkylene diamine compounds suitable as reactants to produce the novel compounds of this invention may be obtained from secondary-alkyl primary amines as described in U.S. Pat. application Ser. No. 422,504, filed Dec. 31, 1964 now U.S. Pat. No. 3,398,196 issued Aug. 20, 1968.

The novel aminopropionamides of this invention, as illustrated by the above formula, reflect the isomeric nature of the amine reactants as used for their preparation. The amine reactants used to prepare the aminopropionamides compound of this invention may be derived from olefinic compounds, in which case the nitrogen atom attached to the secondary-alkyl group may be attached to different interior carbon atoms along a hydrocarbon chain. Isomeric mixtures of various secondary-alkyl amines may be used to form the novel aminopropionamides of this invention. Of particular importance as reactants of this invention are secondary-alkyl amine compounds derived from alpha olefins. Further, the secondary-alkyl amine reactants used to form the aminopropionamides of this invention may consist of a mixture of different hydrocarbon chain lengths, usually extending over a range from 2 to about 6 numerically consecutive chain lengths. The mixture of chain lengths is generally dependent upon the cut of mixed olefins from which the secondary-alkylamines were derived, and is not critical in the formation of the compounds of this invention.

One phase of our invention relates to the surprising effectiveness of the branched chain β-aliphatic-aminopropconamides as slip agents in hot melt wax adhesive compositions. A large use of such adhesives is to bond layers of paperboard to one another. Adhesive is generally applied to the paperboard by steel rollers which are submersed in a heated vat containing the wax adhesive and then brought into contact with the paperboard. The slip agent is used to prevent the wax adhesive from sticking to the roller as it is being applied to the paperboard. It is desirable that the slip agent have no deleterious effect on the bonding of the adhesive wax coated layers of paperboard to each other, but should prevent the adhesive from adhering to the steel roller. It has been found that the compounds of this invention function for use as hot melt wax slip agents in a manner superior to oleylamide which is presently being used for such purposes, and further, it has been found that the branched chain propionamides of this invention are surprisingly superior to the normal-alkyl propionamides. The compounds of this invention are added to the hot melt wax adhesive in an amount from about 1 to 10 weight percent. It is preferred to utilize from 2 to 6 weight percent of the propionamide compounds of this invention. THE BRANCHED CHAIN β-aliphaticaminopropionamides may advantageously be used with other additives, and it has been found particularly advantageous to blend the compounds of this invention with fatty acids, especially phenylstearic acid.

The following examples are presented to illustrate the present invention.

EXAMPLE I

β—($C_7$—$C_9$sec-alkylamino)propionamide was prepared in the following manner. A 100 ml. round bottom flask with a magnetic stirrer was charged with 0.3 mole of $C_7$—$C_9$ secondary-alkyl primary amine. The temperature was raised to 80° C. and 0.3 mole of acrylamide was added slowly over a 25 minute period. The mixture was stirred at 80–95° C. for 30 minutes. The crude product was obtained as a pale yellow oil (92.5 percent yield) having the following analysis:
Neutralization equivalent 202 (calc'd. 205)
Primary amine 16.7 percent
Secondary amine 76 percent

EXAMPLE II

β—($C_9$—$C_{11}$sec-alkylamino) propionamide was prepared following the procedure of Example I except that $C_9$—$C_{11}$ secondary-alkyl primary amine was used. The mixture was stirred at 80–90° C. for 30 minutes. The crude product was obtained as a yellow oil in almost quantitative yield having the following analysis:
Neutralization equivalent 232 (calc'd. 233)
Primary amine 12.2 percent
Secondary amine 83.5 percent

EXAMPLE III

β—($C_{11}$—$C_{14}$ sec-alkylamino)propionamide was prepared following the procedure of Example I using 0.3 mole of $C_{11}$—$C_{14}$ secondary-alkyl primary amine. The temperature was raised to 90° C. and 0.33 mole of acrylamide was added over a 15 minute period. The mixture was stirred at 85–95° C. for 1 hour, then filtered through a pressure filter to remove any polycrylamide. The crude product was obtained as a yellow oil, 94.5 percent yield, having the following analysis:
Neutralization equivalent 267 (calc'd 264)
Primary amine 14.9 percent
Secondary amine 78.0 percent

EXAMPLE IV

β—($C_{15}$–$C_{20}$ sec-alkylamino)propionamide was prepared as in Example I using 0.2 mole of $C_{15}$–$C_{20}$ secondary-alkylamine and 0.2 mole of acrylamide to obtain a crude product having the appearance of a yellow oil in almost quantitative yield and having the following analysis:
   Neutralization equivalent 357 (calc'd 358)
   Primary amine 13.2 percent
   Secondary amine 83.5 percent

EXAMPLE V

3–[3′–($C_7$–$C_9$ sec-alkylamino)propylamino]propionamide was prepared following the procedure of Example I using 0.2 mole of N–($C_7$–$C_9$ sec-alkyl)-1,3-propanediamine and 0.2 mole of acrylamide. The crude product was obtained in almost quantitative yield and has the following analysis:
   Neutralization equivalent 129 (calc'd 131)
   Primary amine 5.7 percent
   Secondary amine 93 percent

EXAMPLE VI

3–[3′–($C_9$–$C_{11}$ sec-alkylamino)propylamino]propionamide was prepared in the same manner as Example V using N–($C_9$–$C_{11}$ sec-alkyl) 1,3-propanediamine as a reactant. The crude product was obtained in almost quantitative yield and had the following analysis:
   Neutralization equivalent 145 (calc'd 146)
   Primary amine 7.0 percent
   Secondary amine 92 percent

EXAMPLE VII

3–[3′–($C_{11}$–$C_{14}$ sec-alkylamino)propylamino]propionamide was prepared using the apparatus described in Example I. 0.2 mole of N–($C_{11}$–$C_{14}$ sec-alkyl)–1, 3propanediamine was added to the flask, the temperature was raised to 85–95° C. and 0.2 mole acrylamide was added slowly over a 15 minute period. The mixture was stirred for 1 hour at 95–110° C. and then filtered to remove any polyacrylamide. The crude product was obtained in 95.5 percent yield as a yellow oil having the following analysis:
   Neutralization equivalent 163 (calc'd. 162.5)
   Primary amine 6.35 percent
   Secondary amine 81.2 percent
   Tertiary amine 11.9 percent

EXAMPLE VIII

3–[3′–($C_{15}$–$C_{20}$ sec-alkylamino)propylamino]propionamide was obtained by following the procedure of Example I using 0.2 mole of N–($C_{15}$–$C_{20}$ sec-alkyl)-1, 3-propanediamine. The crude product was obtained in almost quantitative yield and has the following analysis:
   Neutralization equivalent 205 (calc'd. 203)
   Primary amine 8.2 percent
   Secondary amine 90.5 percent

EXAMPLE IX

Branched chain β-aliphaticaminopropionamides of this invention were compared with straight chain β-aliphaticaminopropionamides for the settling of fuel oil sludge from kerosene. Amounts of additives as set forth in Table 1 were added in a 1 percent kerosene stock solution to 100 mls. of kerosene. Then 5 gms. of fuel oil sludge and 10 mls. of tap water were added to the bottles containing kerosene-additive mixtures and the bottles were then shaken vigorously. The bottles were then allowed to stand without any movement and the time for the sludge to settle out was observed and recorded. A control containing no additive was run under the same conditions. The results are shown in Table 1.

TABLE I

| Chemical Additive | p.p.m. | Time for Particles to Settle Out |
| --- | --- | --- |
| Control—No additive | – | 72 hours |
| β–($C_{11}$–$C_{14}$ sec-alkylamino-propionamide | 10<br>25<br>50<br>100 | 3–5 min.<br>3–5 min.<br>3–5 min.<br>3–5 min. |
| β–(cocoamino*) propionamide | 10<br>25<br>50<br>100 | 3 hours<br>3 hours<br>4 hours<br>4 hours |
| 3–[3′–($C_{11}$–$C_{14}$ sec-alkylamino)-propylamino] propionamide | 10<br>25 | 15 min.<br>15 min. |
| 3–[3′–(cocoamino) propylamino]-propionamide | 10<br>25 | 5 hours<br>2 hours |

*Cocoamines are derived from coconut oil fatty acids having hydrocarbon chain lengths of from $C_{10}$–$C_{18}$, saturated and unsaturated, predominately dodecyl and tetradecyl.

EXAMPLE X

The use of compounds of this invention and other amides as slip agents for hot melt wax adhesives were compared in the following manner. The noted slip agent was added in the below stated quantity to a melted adhesive containing petroleum wax and a copolymer of ethylene and vinyl acetate sold by DuPont under the trademark Elvax. The adhesive containing the slip agent was applied to a strip of cardboard which was then placed with the adhesive adjacent to a sheet of stainless steel and oven cured at 350° for 30 minutes. The stainless steel-adhesive-cardboard sandwich was then placed in an oven at 100° F for an additional 15 minutes. The stainless steel-adhesive-cardboard sandwich was removed from the oven and the ease of stripping the cardboard from the stainless was noted. It is desirable for the cardboard to be readily stripped from the steel.

Two pieces of cardboard coated with the same adhesive containing slip agent were placed with adhesive sides adjacent and oven cured at 300° F. for 20 minutes. The steel-adhesive-cardboard sandwich was cooled for 4 hours. It was then attempted to strip the two pieces of cardboard apart and the results are noted below. It is desirable that the two pieces of cardboard be inseparable.

5 percent oleylamide, which is used as a slip agent in hot adhesive waxes, was used as a standard. The results are shown in Table II.

EXAMPLE XI

The same procedure as described in Example X was followed using the following hot melt was adhesive:
   80 percent pure refined paraffin wax
      (sold by the Texas Company under the trademark Tex-wax)
   10 percent polybutylene
   10 percent crude polystyrene
The noted slip agent was added in the below stated quantities to the melted adhesive which was then applied to the paperboard and was subjected to the same treatment and conditions as set forth in Example X, giving results shown in Table III using the same rating scale as in Table II.

TABLE II

| Slip agent additive | Conc., percent | Steel to cardboard, 100° F. | Cardboard to cardboard at room temp. |
|---|---|---|---|
| Oleylamide | 5 | 0 | 0 |
| β-($C_{15}$-$C_{20}$ sec-alkyl)aminopropionamide | 5 | +3 | +1 |
| | 4 | +2 | +2 |
| | 3 | +1 | +2 |
| β-($C_{15}$-$C_{20}$ sec-alkyl)aminopropionamide | 2½ | | |
| Phenylstearic acid | 2½ | +5 | +2 |
| β-($C_{15}$-$C_{20}$ sec-alkyl) aminopropionamide | 2 | | |
| Phenylstearic acid | 2 | +5 | +1 |
| β-($C_{15}$-$C_{20}$ sec-alkyl)aminopropionamide | 1½ | | |
| Phenylstearic acid | 1½ | +2 | +2 |

NOTE.—Ease of stripping: 0—5% oleylamide; +1, +2, +3, and +4—stripped more easily than 5% oleylamide; and +5—readily stripped, clean break.

TABLE III

| Slip agent additive | Conc., Percent | Steel to cardboard, 100° F. | Cardboard to Cardboard at room temp. |
|---|---|---|---|
| Oleylamide | 5 | 0 | 0 |
| β-(Oleylamino*)propionamide | 5 | +1 | 0 |
| 3-[3'-(oleylamino)propylamino]propionamide | 5 | +1 | 0 |
| 3-[3'-(oleylamino)propylamino]propionamide | 2½ | +2 | +1 |
| Phenylstearic acid | 2½ | | |
| 3-[3'-($C_{15}$-$C_{20}$ sec-alkylamino)propylamino]propionamide | 5 | +3 | +1 |
| 3-[3'-($C_{15}$-$C_{20}$ sec-alkylamino)propylamino]propionamide | 2½ | | |
| Phenylstearic acid | 2½ | +5 | +2 |

*Oleylamino is derived from commercial oleic acids having hydrocarbon chain lengths from $C_{14}$-$C_{18}$, saturated and unsaturated, predominately oleic.

We claim:

1. A β–aliphaticaminopropionamide having the formula $$R-NH-CH_2-CH_2-\overset{O}{\underset{\|}{C}}-NH_2$$

wherein R is selected from the group consisting of secondary-alkyl and secondary-alkyl-NH(CH$_2$)$_n$-wherein said alkyl radicals have from 6 to 22 carbon atoms and n is an integer from 2 to 4.

2. A compounds of claim 1 wherein R is selected from the group consisting of

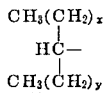  and  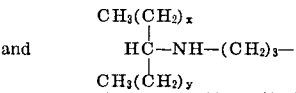

wherein x and y are integers having a sum of 3 to 19.

3. A compounds of claim 1 wherein R is selected from the group consisting of

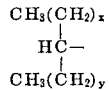

wherein x and y are integers having a sum of 3 to 19.

4. A compounds of claim 3 wherein x and y are integers having a sum from 8 to 11.

5. β–aliphaticaminopropionamide having the formula

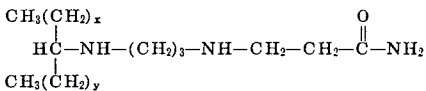

wherein x and y are integers having a sum of 3 to 19.

6. A compounds of claim 5 wherein x and y are integers having a sum from 8 to 11.